United States Patent
Laroia et al.

(10) Patent No.: US 7,398,111 B2
(45) Date of Patent: *Jul. 8, 2008

(54) METHODS AND APPARATUS FOR OPERATING MOBILE NODES IN MULTIPLE STATES

(75) Inventors: Rajiv Laroia, Basking Ridge, NJ (US); Junyi Li, Bedminster, NJ (US); Sathyadev Venkata Uppala, Scotch Plains, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

This patent is subject to a terminal disclaimer.

(21) Appl. No.: 11/174,793

(22) Filed: Jul. 5, 2005

(65) Prior Publication Data

US 2005/0245264 A1   Nov. 3, 2005

Related U.S. Application Data

(63) Continuation of application No. 10/378,563, filed on Mar. 3, 2003, now Pat. No. 6,961,595, and a continuation-in-part of application No. 10/324,194, filed on Dec. 20, 2002, now Pat. No. 6,788,963.

(60) Provisional application No. 60/401,920, filed on Aug. 8, 2002.

(51) Int. Cl.
*H04B 1/38* (2006.01)
*H04B 1/00* (2006.01)

(52) U.S. Cl. .................................. 455/574; 455/522

(58) Field of Classification Search ............ 455/574, 455/522, 434, 343.2, 343.3, 343.4; 340/7.32–7.35; 370/311, 329

See application file for complete search history.

(56) References Cited

U.S. PATENT DOCUMENTS

| | | | |
|---|---|---|---|
| 4,679,244 A | 7/1987 | Kawasaki et al. |
| 4,833,701 A | 5/1989 | Comroe et al. |
| 4,901,307 A | 2/1990 | Gilhousen et al. |
| 5,056,109 A | 10/1991 | Gilhousen et al. |
| 5,095,529 A | 3/1992 | Comroe et al. |

(Continued)

FOREIGN PATENT DOCUMENTS

WO    WIPO 9512297    5/1995

(Continued)

*Primary Examiner*—Lee Nguyen
(74) *Attorney, Agent, or Firm*—Straub & Pokotylo; Michael P. Straub; Ronald P. Straub

(57) ABSTRACT

The use of multiple states of mobile communication device operation to allow a single base station to support a relatively large number of mobile nodes is described. Various states require different amounts of communications resources, e.g., bandwidth and/or control signaling. Different numbers of control channels are monitored during different states of operation. A mobile node monitors during a first state of operation, e.g., the on-state, a first control channel to detect control signals in segments of the first control channel intended for the mobile node, detects a period of reduced control signaling to said mobile node on said first control channel, and then, in response to detecting a period of reduced control signal signaling to the mobile node, transitions from said first state to a second state of operation. During the second state of operation fewer control channels are monitored and the first control channel is not monitored.

20 Claims, 7 Drawing Sheets

U.S. PATENT DOCUMENTS

| | | | |
|---|---|---|---|
| 5,128,938 A | 7/1992 | Borras | |
| 5,267,261 A | 11/1993 | Blakeney, II et al. | |
| 5,325,432 A | 6/1994 | Gardeck et al. | |
| 5,369,781 A | 11/1994 | Comroe et al. | |
| 5,387,905 A | 2/1995 | Grube et al. | |
| 5,420,909 A | 5/1995 | Ng et al. | |
| 5,450,405 A | 9/1995 | Maher et al. | |
| 5,461,645 A | 10/1995 | Ishii | |
| 5,463,617 A | 10/1995 | Grube et al. | |
| 5,465,391 A | 11/1995 | Toyryla | |
| 5,473,605 A | 12/1995 | Grube et al. | |
| 5,491,835 A | 2/1996 | Sasuta et al. | |
| 5,511,232 A | 4/1996 | O'Dea et al. | |
| 5,513,381 A | 4/1996 | Sasuta | |
| 5,542,108 A | 7/1996 | Sasuta | |
| 5,566,366 A | 10/1996 | Russo et al. | |
| 5,590,396 A | 12/1996 | Henry | |
| 5,594,948 A | 1/1997 | Talarmo et al. | |
| 5,625,882 A | 4/1997 | Vook et al. | |
| 5,627,882 A | 5/1997 | Chien et al. | |
| 5,634,197 A | 5/1997 | Paavonen | |
| 5,884,196 A | 3/1999 | Lekven et al. | |
| 5,982,760 A | 11/1999 | Chen | |
| 6,021,123 A | 2/2000 | Mimura | |
| 6,108,542 A | 8/2000 | Swanchara et al. | |
| 6,243,584 B1 | 6/2001 | O'Byrne | |
| 6,266,529 B1 | 7/2001 | Chheda | |
| 6,275,712 B1 | 8/2001 | Gray et al. | |
| 6,307,849 B1 | 10/2001 | Tiedemann, Jr. | |
| 6,308,080 B1 | 10/2001 | Burt et al. | |
| 6,334,047 B1 | 12/2001 | Andersson et al. | |
| 6,400,703 B1 | 6/2002 | Park et al. | |
| 6,456,604 B1 | 9/2002 | Lee et al. | |
| 6,498,934 B1 | 12/2002 | Muller | |
| 6,546,252 B1 | 4/2003 | Jetzek et al. | |
| 6,611,506 B1 | 8/2003 | Huang et al. | |
| 6,657,988 B2 | 12/2003 | Toskala et al. | |
| 6,690,936 B1 | 2/2004 | Lundh | |
| 6,721,289 B1 | 4/2004 | O'Toole et al. | |
| 6,904,283 B2 | 6/2005 | Li et al. | |
| 2001/0031639 A1 | 10/2001 | Makipaa | |
| 2001/0034236 A1 | 10/2001 | Tong et al. | |
| 2002/0077152 A1 | 6/2002 | Johnson et al. | |
| 2003/0117969 A1 | 6/2003 | Koo et al. | |

FOREIGN PATENT DOCUMENTS

| | | |
|---|---|---|
| WO | WIPO 9627993 | 9/1996 |
| WO | WIPO 9712475 | 4/1997 |

METHODS AND APPARATUS FOR OPERATING MOBILE NODES IN MULTIPLE STATES

RELATED APPLICATION

This application is a continuation of U.S. patent application Ser. No. 10/378,563, filed on Mar. 3, 2003 now U.S. Pat. No. 6,961,595, which claims the benefit of U.S. Provisional Patent Application Ser. No. 60/401,920 filed on Aug. 8, 2002, titled: "Methods and Apparatus for Implementing Mobile Communications System" and is a continuation-in-part of U.S. patent application Ser. No. 10/324,194 filed Dec. 20, 2002 now U.S. Pat. No. 6,788,963. The full text of both of the preceding applications is hereby expressly incorporated by reference.

FIELD OF THE INVENTION

The present invention is directed to wireless communications systems and, more particularly, to methods and apparatus for supporting a plurality of mobile nodes in a communications cell with limited resources.

BACKGROUND OF THE INVENTION

Wireless communications systems are frequently implemented as one or more communications cells. Each cell normally includes a base station which supports communications with mobile nodes that are located in, or enter, the communications range of the cell's base station. Within a cell or a sector of a cell, the unit of communications resource is a symbol, e.g., QPSK or QAM transmitted on one frequency tone for one time slot in an orthogonal frequency division multiplexed (OFDM) system. The total available communication resource is divided into a number of such symbols (units) which can be used for communicating control and data information between a base station and one or more mobile nodes in the cell and tends to be limited. Control signals transmitted between a base station and a mobile node may be transmitted in two possible directions, i.e., from the base station to the mobile node or from the mobile node to the base station. Transmission of signals from the base station to the mobile is often called a downlink. In contrast, transmission from the mobile to the base station is commonly referred to as an uplink.

In order to provide efficient use of limited communications resources, base stations may allocate different numbers of tones to different mobile nodes depending on the devices' bandwidth needs. In a multiple access system, several nodes may be transmitting data, e.g., in the form of symbols, to a base station at the same time using different tones. This is common in OFDM systems. In such systems, it is important that symbols from different mobile nodes arrive at the base station in a synchronized manner, e.g., so the base station can properly determine the symbol period to which a received symbol belongs and signals from different mobile nodes do not interfere with each other. As mobile nodes move in a cell, transmission delay will vary as a function of the distance between a mobile node and a base station. In order to make sure that transmitted symbols will arrive at a base station from different mobile nodes in synchronized manner, timing control signals, e.g., feedback signals, may be and in many cases are, transmitted to each active mobile node of a cellular system. The timing control signals are often specific to each device and represent, e.g., timing corrections of offsets to be used by the device to determine symbol transmission timing. Timing control signaling operations include, e.g., monitoring for timing control signals, decoding received timing control signals, and performing timing control update operations in response to the decoded received timing control signals.

Timing control signals can be particularly important in systems where there are a large number of mobile nodes. In order to avoid interference from a mobile node due to timing miss synchronization, it may be necessary to establish timing synchronization and control before allowing a mobile node to transmit data, e.g., voice data, IP packets including data, etc. to a base station.

In addition to managing limited resources such as bandwidth, power management is often a concern in wireless communications systems. Mobile nodes, e.g., wireless terminals, are often powered by batteries. Since battery power is limited, it is desirable to reduce power requirements and thereby increase the amount of time a mobile node can operate without a battery recharge or battery replacement. In order to minimize power consumption, it is desirable to limit the amount of power used to transmit signals to a base station to the minimal amount of power required. Another advantage of minimizing mobile node transmission power is that it has the additional benefit of limiting the amount of interference that the transmissions will cause in neighboring cells which will often use the same frequencies as an adjoining cell.

In order to facilitate transmission power control, power control signaling, e.g., a feedback loop, may be established between a base station and a mobile node. Power control signaling often takes place at a much faster rate than the timing control signaling. This is because power control signaling attempts to track variations in the signal strength between the base station and the mobile nodes and this can typically vary on the scale of milliseconds. The timing control needs to take into consideration changes in the distance between base station and the mobile nodes and this tends to vary on a much slower scale, typically hundreds of milliseconds to seconds. Thus the amount of control signaling overhead for power control tends to be much more than that for timing control.

In addition to timing and power control signaling, other types of signaling may be employed. For example mobile nodes in addition may also signal on an uplink the quality of the downlink channel. This may be used by the base station to determine the communication resource allocation to allow for the transfer of data packets from the base station to the mobile. Such downlink channel quality reports allows a base station to determine which mobile node to transmit to and if a mobile node is chosen then the amount of forward error correction protection to apply to the data. These downlink channel quality reports generally are signaled on a similar time scale as the power control signaling. As another example, signaling may be used to periodically announce a mobile node's presence in a cell to a base station. It can also be used to request allocation of uplink resources, e.g., to transmit user data in a communications session. Shared as opposed to dedicated resources may be used for such announcements and/or resource requests.

Signaling resources, e.g., time slots or tones, may be shared or dedicated. In the case of shared time slots or tones, multiple devices may attempt to use the resource, e.g., segment or time slot, to communicate information at the same time. In the case of a shared resource, each node in the system normally tries to use the resource on an as needed basis. This sometimes results in collisions. In the case of dedicated resources, e.g., with time slots and/or tones being allocated to particular communications device or group of devices to the exclusion of other devices for a certain period of time, the problem of possible collisions is avoided or reduced. The dedicated resources may be part of a common resource, e.g., a common channel, where segments of the channel are dedicated, e.g., allocated, to individual devices or groups of devices where the groups include fewer than the total number of mobile nodes in a cell. For example, in the case of an uplink time segments may be dedicated to individual mobile nodes to prevent the possibility of collisions. In the case of a downlink, time slots may be dedicated to individual devices or, in the case of multicast messages or control signals, to a group of devices which are to receive the same messages and/or control signals. While segments of a common channel may be dedicated to individual nodes at different times, over time multiple nodes will use different segments of the channel thereby making the overall channel common to multiple nodes.

A logical control channel dedicated to an individual mobile node may be comprised of segments of a common channel dedicated for use by the individual mobile node.

Dedicated resources that go unused may be wasteful. However, shared uplink resources which may be accessed by multiple users simultaneously may suffer from a large number of collisions leading to wasted bandwidth and resulting in an unpredictable amount of time required to communicate.

While timing and power control signals and downlink channel quality reports are useful in managing communications in a wireless communications system, due to limited resources it may not be possible for a base station to support a large number of nodes when power control, and other types of signaling need to be supported on a continuous basis for each node in the system.

In view of the above discussion, it is apparent that there is a need for improved methods of allocating limited resources to mobile nodes to permit a relatively large number of nodes to be supported by a single base station with limited communications resources. It is desirable that at least some methods of communications resource allocation and mobile node management take into consideration the need for timing control signaling and the desirability of power control signaling in mobile communications systems.

SUMMARY OF THE INVENTION

The present invention is directed to methods and apparatus for supporting multiple wireless terminals, e.g., mobile nodes, using a single base station and limited resources such as bandwidth for the transmission of signals between the base station and mobile nodes, e.g., in a communications cell. A system may be implemented in accordance with the invention as a plurality of cells, each cell including at least one base station which serves multiple mobile nodes. A mobile node can, but need not, move within a cell or between cells.

In accordance with the present invention, mobile nodes support multiple states of operation. The control signaling resources used by a mobile node vary depending on the state of operation. Thus, depending on the state of the mobile node, a large amount of signaling resources may be required while in other states a minimum amount of resources may be required. Control signaling resources are in addition to data transmission resources, e.g., bandwidth used to communicate payload data such as voice, data files, etc. By supporting different mobile node states of operation, requiring differing amounts of base station/mobile node control communications resources, e.g., signal bandwidth, used for control purposes, more mobile nodes can be supported by a base station than could be supported if all mobile nodes were allocated the same amount of communications resources for control signaling purposes.

Bandwidth allocated to a particular mobile device for communicating control signals between the mobile device and a base station is known as dedicated control bandwidth. Dedicated control bandwidth may comprise multiple dedicated logical or physical control channels. In some embodiments, each dedicated control channel corresponds to one or more dedicated segments of a common control channel. Control channel segments may be, e.g., channel time slots used for transmitting and/or receiving control signals. Dedicated uplink control channel segments differ from shared uplink control channel segments where multiple devices share the same bandwidth for uplink signaling.

In the case of a shared communications channel conflicts may result when multiple nodes, at the same time attempt to transmit a control signal using the shared communications channel.

Mobile nodes implemented in accordance with one exemplary embodiment support four states, e.g. modes of operation. The four states are a sleep state, a hold state, an access state, and an on state. Of these the access state is a transitory stage and the other states are steady states and the mobile nodes can be in these states for an extended period of time.

Of the four states, the on state requires the highest amount of control signaling resources, e.g., bandwidth used for control signaling purposes. In this state, the mobile node is allocated bandwidth on as needed basis for transmitting and receiving traffic data, e.g., payload information such as text or video. Thus, at any given time in the on state a mobile node may be allocated a dedicated data channel for transmitting payload information. In the on state the mobile node is also allocated a dedicated uplink control signaling channel.

In various embodiments, a dedicated uplink control channel is used during the on state by the MN to make downlink channel quality reports, communicate resource requests, implement session signaling, etc. Downlink channel quality reports are normally signaled frequently enough to track variations in the signal strength between the base station and the mobile node.

During the on state, the base station and mobile node exchange timing control signals using one or more dedicated control channels allowing the mobile node to periodically adjust its transmission timing, e.g., symbol timing, to take into consideration changes in distance and other factors which might cause the transmitted signals to drift timing from the base station's perspective, with the signals transmitted by other mobile nodes. As discussed above, the use of timing control signaling and performing timing control signaling operations, such as updating transmission timing, is important in many systems which use orthogonal frequency division multiple access in the uplink to avoid interference from transmission signals generated by multiple nodes in the same cell.

To provide transmission power control, during the on state, transmission power control signaling is employed to provide a feedback mechanism whereby a mobile node is able to efficiently control its transmission power levels based on signals periodically received from the base station with which it is communicating. In various embodiments the base station periodically transmits power control signals over a dedicated control downlink. As part of the transmission power control signaling process, the mobile node, performs various transmission power control signaling operations including, for example, monitoring for transmission power control signals directed to the particular mobile node, decoding received transmission power control signals, and updating its transmission power levels based on the received and decoded transmission power control signals. Thus, in response to receiving power control signals in a dedicated downlink segment corresponding to the particular mobile node, the mobile node adjusts its transmission power level in response to the received signal. In this manner, a mobile node can increase or decease its transmission power to provide for successful receipt of signals by the base station without excessive wastage of power and therefore reducing interference and improving battery life. The power control signaling is typically carried out sufficiently frequently to track fast variations in the signal strength between the base station and the mobile nodes. The power control interval is a function of smallest channel coherence time that the system is designed for. The power control signaling and the downlink channel quality reports are normally of similar time scale, and in general, occur at a much higher frequency than the timing control signaling. However, in accordance with one feature of the present invention the base station varies the rate at which it transmits power control signals to a mobile node as a function of the mobile node's state of operation. As a result, in such an embodiment, the rate at which the mobile node performs transmission power control adjustments will vary as a function of the state in which the mobile node operates. In one exemplary embodiment, power control updates are not performed in the sleep state and, when performed in the hold state, are normally performed at a lower rate than during the on state.

Operation of a mobile node in the hold state requires fewer control communications resources, e.g., bandwidth, than are required to support operation of a mobile node in the on state. In addition, in various embodiments while in the hold state a mobile node is denied bandwidth for transmitting payload data, but the mobile can be allocated bandwidth for receiving payload data. In such embodiments the mobile node is denied a dedicated data uplink communications channel during the hold state. The bandwidth allocated for receiving data may be, e.g., a data downlink channel shared with other mobile nodes. During the hold state timing control signaling is maintained and the mobile node is also allocated a dedicated control uplink communication resource, e.g., dedicated uplink control communications channel, which it can use to request changes to other states. This allows, for example, a mobile node to obtain additional communications resources by requesting a transition to the on state where it could transmit payload data. In some but not all embodiments, in the hold state, the dedicated uplink control channel is limited to the communication of signals requesting permission to change the state of mobile node operation, e.g., from the hold state to the on state. During the hold state the bandwidth allocated, e.g., dedicated, to a mobile node for control signaling purposes is less than in the on-state.

Maintaining timing control while in the hold-state allows the mobile nodes to transmit their uplink requests without generating interference to other mobiles within the same cell and having a dedicated uplink control resource ensures that the delays for state transition are minimal as the requests for state transitions do not collide with similar requests from other mobile nodes as may occur in the case of shared uplink resources. Since timing control signaling is maintained, when the mobile node transitions from the hold state to the on state it can transmit data without much delay, e.g., as soon as the requested uplink resource is granted, without concerns about creating interference for other mobile nodes in the cell due to drift of uplink symbol timing. During the hold state, transmission power control signaling may be discontinued or performed less frequently, e.g., at greater intervals than performed during on state operation. In this manner, the dedicated control resources used for power control signaling can be eliminated or reduced allowing fewer resources to be dedicated to this purpose than would be possible if power control signaling for all nodes in the hold state was performed at the same rate as in the on state.

When transitioning from the hold state to the on state, the mobile node may start off with an initial high power level to insure that its signals are received by the base station with the power level being reduced once transmission power control signaling resumes at a normal rate as part of on state operation. In one exemplary embodiment, when the mobile node in the hold state intends to migrate to the on state, it transmits a state transition request using a dedicated uplink communication resource, which is not shared with any other mobile nodes. The base station then responds with a broadcast message indicating its response to the mobile's state transition request. The mobile on receiving the base station message meant for it responds with an acknowledgement. The acknowledgment is transmitted over a shared resource on the uplink and is slaved to the broadcast message on the downlink.

By transmitting an appropriate state transition request the mobile may also transition to the sleep state. In one exemplary embodiment, when the mobile node does not intend to migrate to another state, the mobile node may not transmit any signal in its dedicated uplink communication channel, though the dedicated channel has been assigned to the mobile node and is therefore not used by any other mobile nodes. In another embodiment, the mobile node uses an on/off signaling in its dedicated uplink communication channel, where the mobile node sends a fixed signal (on) when it intends to migrate to another state and does not send any signal (off) when it does not intend to migrate to any other state. In this case, the transmission of the fixed signal can be interpreted as a migration request to the on state if the transmission occurs at certain time instances, and as a migration request to the sleep state if the transmission occurs at some other time instances.

In order to support a large number of mobile nodes, a sleep state requiring relatively few communications resources is also supported. In an exemplary embodiment, during the sleep state, timing control signal and power control signaling are not supported. Thus, in the sleep state, the mobile nodes normally do not performing transmission timing control or transmission power control signaling operations such as receiving, decoding and using timing and transmission power control signals. In addition, the mobile node is not allocated a dedicated uplink control resource, e.g., uplink control communications channel, for making state transition requests or payload transmission requests. In addition, during the sleep state the mobile node is not allocated data transmission resources, e.g., dedicated bandwidth, for use in transmitting payload data, e.g., as part of a communications session with another node conducted through the base station.

Given the absence of a dedicated uplink control channel during the sleep state, a shared communications channel is used to contact the base station to request resources necessary for a mobile node to initiate transition from the sleep state to another state.

In some embodiments, in the sleep state the mobile node may, at the behest of the base station serving the cell, signal its presence in the cell, e.g., using a shared communications resource. However, as discussed above, little other signaling is supported during this state of operation. Thus, very little control signaling bandwidth is used to communicate control information between mobile nodes in the sleep state and a base station serving the nodes.

The access state is a state through which a node in the sleep state can transition into one of the other supported states. The transition between states may be triggered by an action by a user of the mobile node, e.g., an attempt to transmit data to another mobile node. Upon entering the access state, transmission power control and timing control signaling has not yet been established. During access state operation, timing control signaling is established and, in various embodiments, full or partial transmission power control signaling is established. A mobile node can transition from the access state to either the on state or the hold state.

The establishment of the timing synchronization and transmission power control can take some amount of time during which data transition is delayed. Also the access process happens through a shared media and contentions between mobile nodes need to be resolved. By supporting a hold state in accordance with the present invention, in addition to a sleep state, such delays can be avoided for a number of mobile nodes, as transition from the hold state to the on state does not go through the access state, while the number of nodes which can be supported by a single base station is larger than would be possible without the use of reduced signaling states of mobile node operation.

In some embodiments, for an individual cell, the maximum number of mobile nodes that can be in the sleep state at any given time is set to be greater than the maximum number of mobile nodes that can be in the hold state at given time. In addition, the maximum number of mobile nodes which can be in the hold at any given time is set to be greater than the maximum number of nodes that can be in the on state at any given time.

In accordance with a power conservation feature of the present invention, downlink control signaling from the base station to the mobile nodes is divided into a plurality of control channels. A different number of downlink control channels are monitored by a mobile node depending on the node's state of operation. During the on state the greatest number of downlink control channels are monitored. During the hold state a smaller number of downlink control channels are monitored than during the on state. In the sleep state the smallest number of downlink control channels are monitored.

To further reduce power consumption in the mobile node associated with monitoring for control signals, in accordance with one feature of the invention control channels monitored during the hold and sleep states are implemented as periodic control channels. That is, signals are not broadcast on a continuous basis on the control channels monitored in the hold and sleep states. Thus, during the hold and sleep states the mobiles monitor for control signals at periodic intervals and save power by not monitoring for control signals at those times when control signals are not transmitted on the monitored channels. To further decrease the time a particular mobile needs to monitor for control signals during the hold and sleep states, portions, e.g., segments, of the periodic control channels may be dedicated to one or a group of mobile nodes. The mobile nodes are made aware of which control channel segments are dedicated to them and then monitor the dedicated segments as opposed to all the segments in the control channels. This allows monitoring for control signals to be performed in the hold and sleep states by individual mobile nodes at greater periodic intervals than would be possible if the mobile were required to monitor all segments of the periodic control channels.

In one particular embodiment, during the on state, mobile nodes monitor segments of an assignment channel on a continuous basis and also monitor segments of periodic fast paging and slow paging control channels. When in the hold state the mobiles monitor the fast paging and slow paging control channels. Such monitoring may involve monitoring a subset of the segments of the periodic fast and slow paging channels, e.g., segments dedicated to the particular mobile node. During the hold state in the particular exemplary embodiment the slow paging channel is monitored but not the fast paging channel or the assignment channel. The paging control channels may be used to instruct the mobile node to change states.

By limiting the number of control channels and the rate of control channel monitoring as a function of the state of operation, power resources can be conserved in accordance with the invention while operating in the hold and sleep states.

Numerous additional features, benefits and details of the methods and apparatus of the present invention are described in the detailed description which follows.

DETAILED DESCRIPTION

Figure 1:
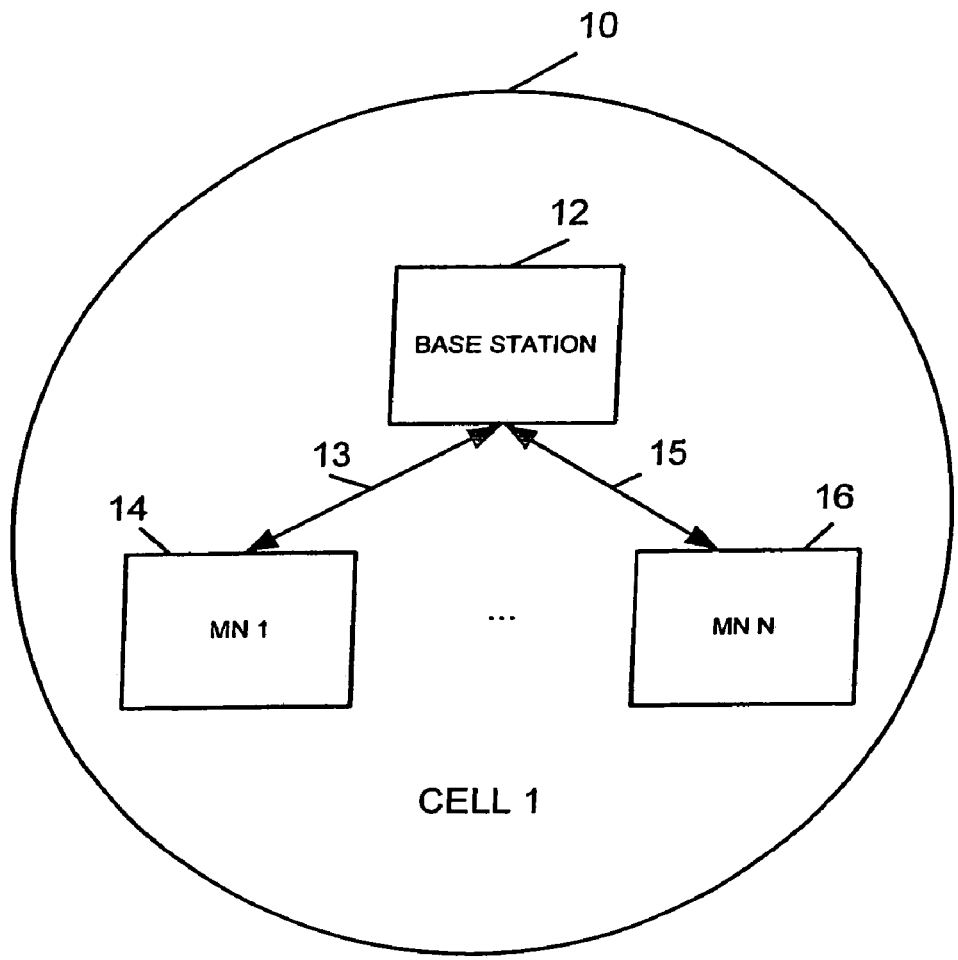
FIG. 1 illustrates an exemplary communication cell, which may be part of a communications system, implemented in accordance with the present invention.

FIG. 1 illustrates a communications cell 10 implemented in accordance with the present invention. A communications system may include multiple cells of the type illustrated in FIG. 1. The communications cell 10 includes a base station 12 and a plurality, e.g., a number N, of mobile nodes 14, 16 which exchange data and signals with the base station 12 over the air as represented by arrows 13, 15. In accordance with the invention, the base station 12 and mobile nodes 14, 16 are capable of performing and/or maintaining control signaling independently of data signaling, e.g., voice or other payload information, being communicated. Examples of control signaling include power control, downlink channel quality reports, and timing control signaling.

Figure 2:
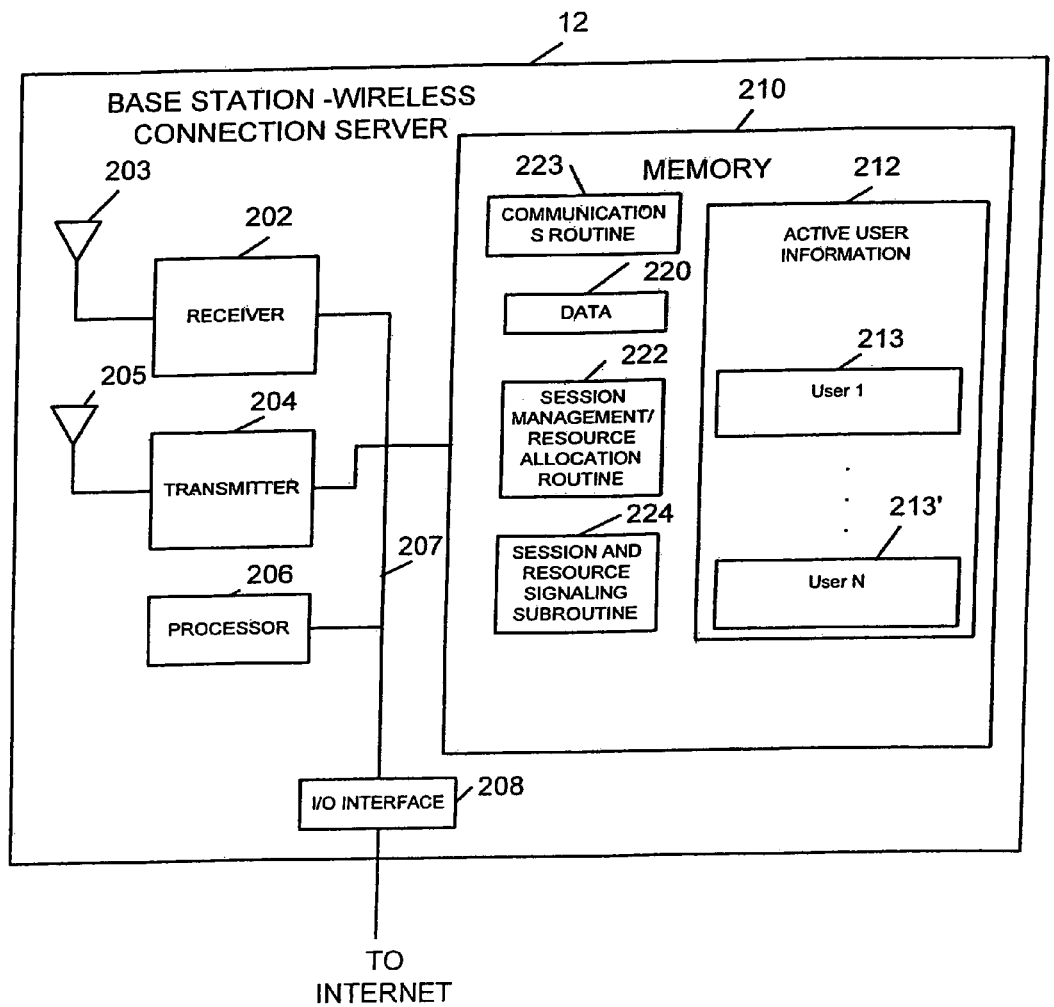
FIG. 2 illustrates a base station implemented in accordance with the present invention.

FIG. 2 illustrates a base station implemented in accordance with the present invention. As shown, the exemplary BS 12 includes a receiver circuit 202, transmitter circuit 204, processor 206, memory 210 and a network interface 208 coupled together by a bus 207. The receiver circuit 202 is coupled to an antenna 203 for receiving signals from mobile nodes. The transmitter circuit 204 is coupled to a transmitter antenna 205 which can be used to broadcast signals to mobile nodes. The network interface 208 is used to couple the base station 12 to one or more network elements, e.g., routers and/or the Internet. In this manner, the base station 12 can serve as a communications element between mobile nodes serviced by the base station 12 and other network elements.

Operation of the base station 12 is controlled by the processor 206 under direction of one or more routines stored in the memory 210. Memory 210 includes communications routines 223, data 220, session management/resource allocation routine 222, session and resource signaling subroutine 224, and active user information 212. Communications routines 223, include various communications applications which may be used to provide particular services, e.g., IP telephony services or interactive gaming, to one or more mobile node users. Data 220 includes data to be transmitted to, or received from, one or more mobile nodes. Data 220 may include, e.g., voice data, E-mail messages, video images, game data, etc.

The session management and resource allocation routine 222 operates in conjunction with subroutines 224 and active user information 212 and data 220. The routine 222 is responsible for determining whether and when mobile nodes may transition between states and also the resources allocated to a mobile node within a state. It may base its decision on various criteria such as, requests from mobile nodes requesting to transition between states, idletime/time spent by a mobile in a particular state, available resources, available data, mobile priorities etc. These criteria would allow a base station to support different quality of service (QOS) across the mobile nodes connected to it.

The session and resource signaling subroutine 224 is called by session management routine 222 when signaling operations are required. Such signaling is used to indicate the permission to transition between states. It is also used to allocate the resources, e.g., when in a particular state. For example, in the on state a mobile node may be granted resources to transmit or receive data.

Active user information 212 includes information for each active user and/or mobile node serviced by the base station 12. For each mobile node and/or user it includes a set of state information 213, 213'. The state information 213, 213' includes, e.g., whether the mobile node is in an on state, a hold state, a sleep state, or an access state as supported in accordance with the present invention, number and types of data packets currently available for transmission to or from the mobile node, and information on the communication resources used by the mobile node.

Figure 3:
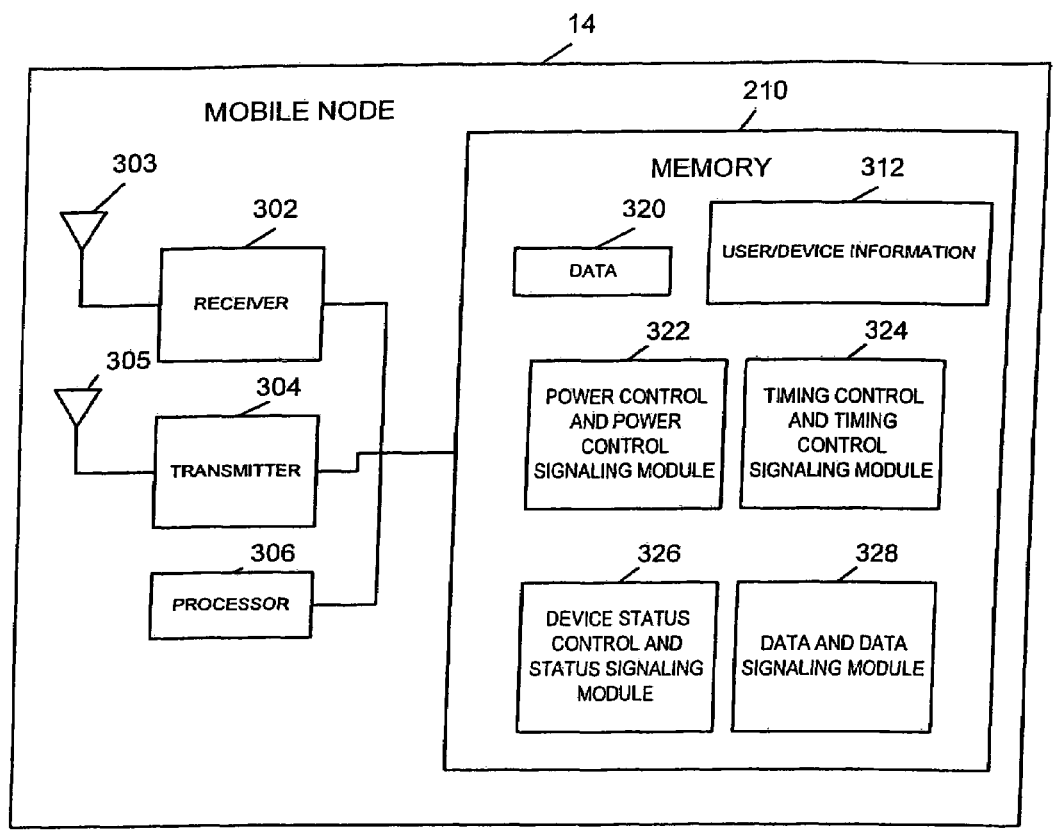
FIG. 3 illustrates a mobile node implemented in accordance with the present invention.

FIG. 3 illustrates an exemplary mobile node 14 implemented in accordance with the invention. The mobile node 14 includes a receiver 302, a transmitter 304, antennas 303, 305, a memory 210 and a processor coupled together as shown in FIG. 3. The mobile node uses its transmitter 306, receiver 302, and antennas 303, 305 to send and receive information to and from base station 12.

Memory 210 includes user/device information 312, data 320, a power control and power control signaling module 322, a timing control and timing control signaling module 324, a device status control and status signaling module 326, and a data control and data signaling module 328. The mobile node 14 operates under control of the modules, which are executed by the processor 306. User/device information 312 includes device information, e.g., a device identifier, a network address or a telephone number. This information can be used, by the base station 12, to identify the mobile nodes, e.g., when assigning communications channels. The user/device information 312 also includes information concerning the present state of the mobile device 14. The data 320 includes, e.g., voice, text and/or other data received from, or to be transmitted to, the base station as part of a communications session.

Device status control and status signaling module 326 is used for device status control and status signaling. Device status control module 326 determines, in conjunction with signals received from the base station 12, what mode, e.g., state, the mobile node 14 is to operate in at any given time. In response to, e.g., user input, the mobile node 14 may request permission from the base station 12 to transition from one state to another and to be granted the resources associated with a given state. Depending on the state of operation at any given time and the communications resources allocated to the mobile node 14, status control and status signaling module 326 determines what signaling is to occur and which signaling modules are to be active. In response to periods of reduced signal activity, e.g., control signal activity, status control and status signaling module 326 may decide to transition from a current state of operation to a state of operation requiring fewer control resources and/or requires less power. The module 326 may, but need not, signal the state transition to the base station. Status control and status signaling module 326 controls, among other things, the number of downlink control channels monitored during each state of operation and, in various embodiments, the rate at which one or more downlink control channels are monitored.

As part of the processes of controlling the state of the mobile node 14, and overseeing general signaling between the mobile node 14 and base station 12, the signaling module is responsible for signaling to the base station 12, when the mobile node 14 first enters a cell and/or when the base station 12 requests that the mobile node 14 indicate it presence. The mobile node 14 may use a shared communication resource to signal its presence to the cell's base station 12, while a dedicated communication resource may be used for other communication signals, e.g., uploading and downloading data files as part of a communication session.

Transmission power control and power control signaling module 322 is used to control the generation, processing and reception of transmission power control signals. Module 322 controls the signaling used to implement transmission power control through interaction with the base station 12. Signals transmitted to, or received from the base station 12 are used to control mobile node transmission power levels under direction of module 322. Power control is used by the base station 12 and the mobile nodes 14, 16 to regulate power output when transmitting signals. The base station 12 transmits signals to the mobile nodes which are used by the mobile nodes in adjusting their transmission power output. The optimal level of power used to transmit signals varies with several factors including transmission burst rate, channel conditions and distance from the base station 12, e.g., the closer the mobile node 14 is to the base station 12, the less power the mobile node 14 needs to use to transmit signals to the base station 12. Using a maximum power output for all transmissions has disadvantages, e.g., the mobile node 14 battery life is reduced, and high power output increases the potential of the transmitted signals causing interference, e.g., with transmissions in neighboring or overlapping cells. Transmission power control signaling allows the mobile node to reduce and/or minimize transmission output power and thereby extend battery life.

Timing control and timing control signaling module 324 is used for timing and timing signaling. Timing control is used in wireless networking schemes such as, e.g., those with uplinks based on orthogonal frequency division multiple access. To reduce the effects of noise, tone hopping may also be used. Tone hopping may be a function of time with different mobile nodes being allocated different tones during different symbol transmission time periods, referred to as symbol times. In order for a base station 12 of a multiple access system to keep track of, and distinguish between, signals from different mobile nodes, it is desirable for the base station 12 to receive information from the mobile nodes in a synchronized manner. A drift of timing between the mobile node 14 and the base station 12 can cause transmission interference making it difficult for the base station to distinguish between symbols transmitted by different mobile nodes, e.g., using the same tone, but during different symbol time periods or using different tones but during the same symbol time period.

For example, the effect on a mobile node's distance from the base station is a factor since transmissions from mobile node that are farther from the base station 12 take longer to reach the base station 12. A late arriving signal can interfere with another connection that has hopped to the late arriving signal's frequency in a latter time period. In order to maintain symbol timing synchronization, it is required to instruct a node to advance or delay its symbol transmission start time to take into consideration changes in signal propagation time to the base station.

Data and data signaling module 328 is used to control transmission and the reception of payload data, e.g., a channel or time slot dedicated to the mobile node for signaling purposes. This includes, e.g., the data packets of an Internet file transfer operation.

In accordance with the present invention, the mobile node 14 can be in one of four states. The signaling, power, and communications resources required by a mobile node will vary depending on the sate in which the mobile node is operating. As a result of using multiple states in the mobile nodes, the base station 12 is able to allocate different degrees of communication resource, e.g., control and data signaling resource, to different mobile nodes as a function of the node's state of operation. This allows the base station 12 to support a greater number of mobile nodes than would be possible if all nodes were continuously in the on state. The particular state that the mobile node 14 is in determines the control signaling and data signaling modules that are executed at any given time and also the level of control signaling between the mobile node and base station 12. The mobile node 14 can also take advantage of the different activity level in different states to save power and extend battery life.

Figure 4:
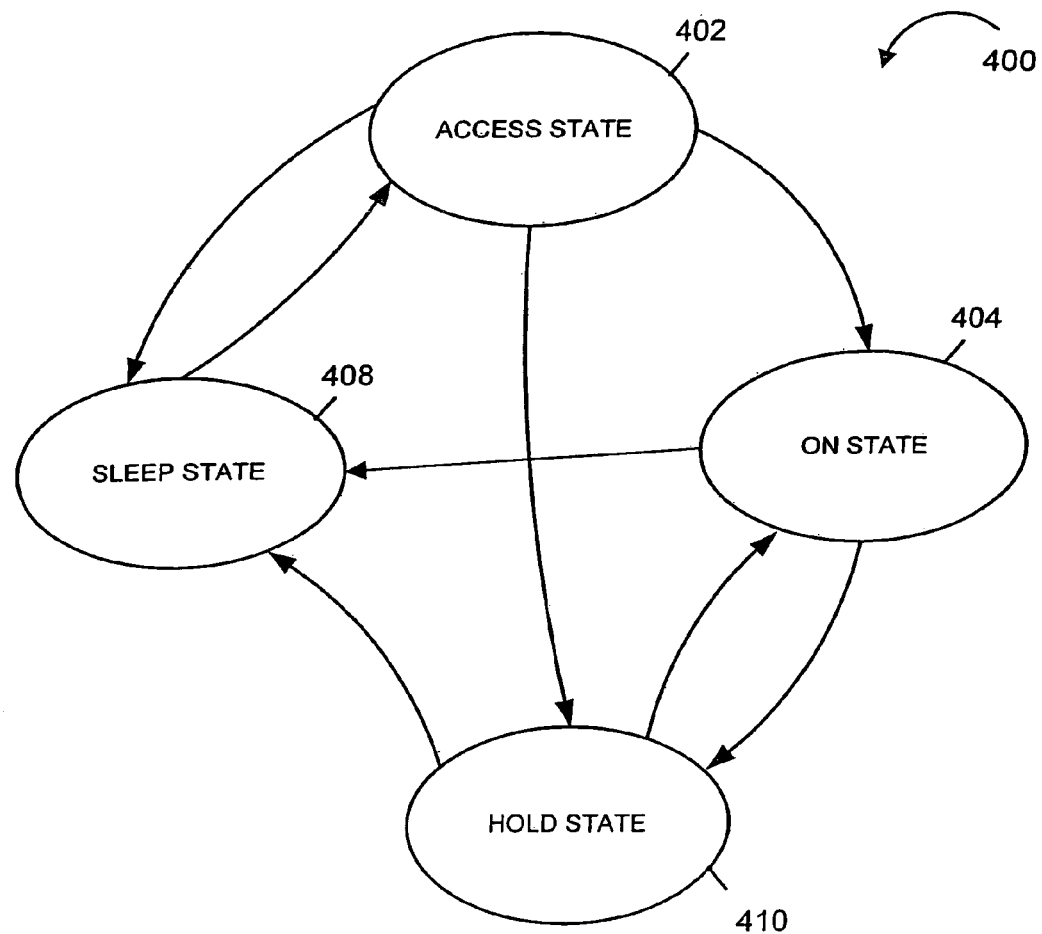
FIG. 4 is a state diagram illustrating the different states that a mobile node may enter while operating in accordance with the present invention.

Operation of the mobile nodes 14 in different states, in accordance with the present invention, will now be explained with reference to FIGS. 4 and 5. FIG. 4 illustrates a state diagram 400 including four possible states, an access state 402, a on state 404, a hold state 410 and a sleep state 408, that a mobile node 14 can enter. Arrows are used in FIG. 4 to illustrate the possible transitions between the four states.

Figure 5:
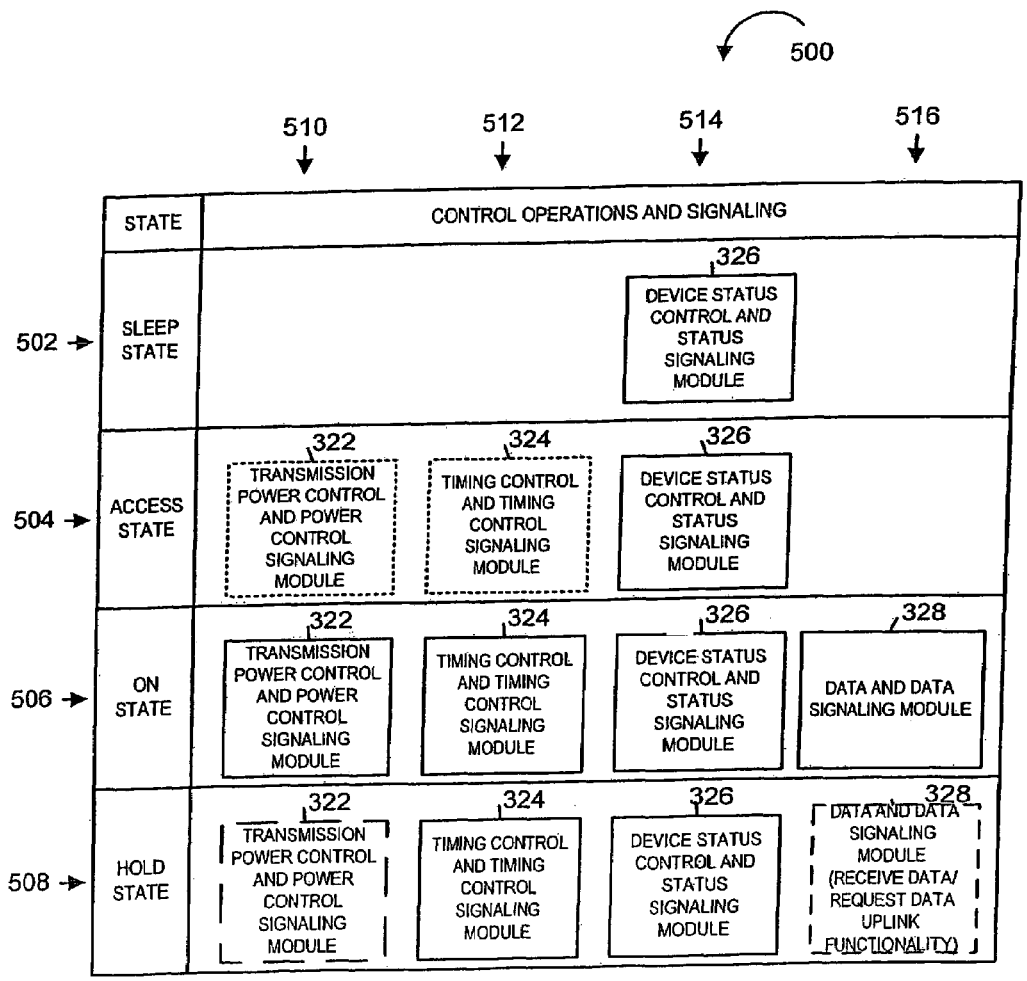
FIG. 5 is a chart illustrating various control and signaling modules that are executed by a mobile node during each of the different states illustrated in FIG. 4.

FIG. 5 illustrates the mobile node modules 322, 324, 326, 328 that are in the various states shown in FIG. 4. Each row of the chart 500 corresponds to a different state. The first through fourth rows 502, 504, 506, 508 correspond to the sleep state, access state, on state, and hold state, respectively. Each column of the chart 500 corresponds to a different module within the mobile node 14. For example, the first column 510 corresponds to the transmission power control and power control signaling module 322, the second column 512 corresponds to the timing control and timing control signaling module 324, the third column 514 corresponds to the device status control and status signaling module 326, while the last column 516 corresponds to the data and data signaling module 328. In FIG. 5, solid lines are used to indicate modules which are active in a particular state. Short dashed lines are used to indicate modules which may transition from an inactive or reduced activity level to a fully active status before the access state is exited, assuming the modules are not already fully active. Long dashed lines are used to indicate a module which may be active in a state but which may perform signaling at a reduced rate while in the indicated state as opposed to the signaling rate implemented in the on state.

From FIG. 5 it can be seen that during the sleep state the device status control and status signaling module 326 remains active but the other modules are inactive allowing for power conservation and a significantly restricting mobile node activity. In the access state 402, which serves as transition state, transmission power control and power control signaling module 322, timing control and timing control signaling module 324 will become fully active (or active at a reduced rate in the case of the transmission power control and power control signaling module 322 in some embodiments) prior to leaving the access state 402 to enter the on-state 404 or hold state 410. In the on-state, all signaling modules 322, 324, 326, 328 are fully active requiring the most power from the mobile node's perspective and the highest allocation of communication resources, e.g., bandwidth, from the base station's perspective. In the hold state, transmission power control and power control signaling module 322 may be inactive or active at a much reduced signaling rate. Timing control and timing control signaling module 324 remains alive as does the device status control and status signaling module 326. The data and data signaling module 326 is either inactive or operates to implement reduced functionality, e.g., receive data but not transmit data as part of a communication session between various nodes. In this manner, the hold state allows bandwidth and other communications resources to be conserved while, in some cases, allowing the mobile node to receive, e.g., multi-cast signals and/or messages.

Each of the states, and potential transition between states, will now be described in detail with reference to the state diagram of FIG. 4.

Of the four states 402, 404, 410, 408, the on state 404 allows the mobile node to perform the widest range of supported communications activities but requires the highest amount of signaling resources, e.g., bandwidth. In this state 404, which may be thought of as a "fully-on" state, the mobile node 14 is allocated bandwidth on an as needed basis for transmitting and receiving data, e.g., payload information such as text or video. The mobile node 14 is also allocated a dedicated uplink signaling channel which it can use to make downlink channel quality reports, communication resource requests, implement session signaling, etc. To be useful, these downlink channel quality reports should be signaled sufficiently frequently to track variations in the signal strengths received by the mobile nodes.

During the on state 404, under control of module 324, the base station 12 and mobile node 14 exchange timing control signals. This allows the mobile node 14 to periodically adjust its transmission timing, e.g., symbol timing, to take into consideration changes in distance and other factors which might cause the mobile node transmitted signals to drift timing at the base station's receiver, with respect to the signals transmitted by other mobile nodes 16. As discussed above, the use of symbol timing control signaling is employed in many systems which use orthogonal frequency division multiple access in the uplink, to avoid interference from transmission signals generated by multiple nodes in the same cell 10.

To provide transmission power control, during the on state 404, transmission power control signaling is employed, under direction of module 322, to provide a feedback mechanism whereby a mobile node is able to efficiently control its transmission power levels based on signals periodically received from the base station with which it is communicating. In this manner, a mobile node 14 can increase and/or decrease its transmission power to provide for successful receipt of signals by the base station 12 without excessive wastage of power and therefore reduced battery life. The power control signaling is carried out sufficiently frequently to track variations in the signal strength between the base station 12 and the mobile nodes 14, 16 for a certain minimum channel coherence time. The power control interval is a function of channel coherence time. The power control signaling and the downlink channel quality reports are of similar time scale, and in general, occur at much higher rate than the timing control signaling required to support vehicular mobility.

From the on state 404, the mobile node 14 can transition into either the sleep state 408 or the hold state 410. Each of these states requires reduced communication resources, e.g., bandwidth, to support than does the on state 404. The transition may be in response to user input, e.g., a user terminating a communications session or in response to the loss of communications resources, e.g., bandwidth required to support the transmission and/or receipt of information to be communicated such as voice or data information.

In accordance with the present invention, in the hold state, a mobile node is denied bandwidth for transmitting payload data. However, timing control signaling is maintained and the mobile node is also allocated a dedicated uplink communication resource which it can use to request changes to other states. This allows for instance a mobile node to obtain additional communications resources by requesting a transition to on state where it could transmit payload data. Maintaining timing control during the hold state 410 allows the mobile node 14 to transmit its uplink requests without generating interference to other mobiles 16 within the same cell 10. Having a dedicated resource for transmitting requests to the base station 12 also helps ensure that the delays for state transition are minimal as these requests do not collide with similar requests from other mobiles.

From the hold state 410, the mobile node may transition into the on state 404, e.g., upon being granted a requested communication resource. Alternatively, the mobile node can transition into the sleep state 408. Since timing control signaling is maintained in the hold state 410, when the mobile node transitions to the on state it can transmit data without much delay, e.g., as soon as the requested bandwidth is granted, without concerns about creating interference to the uplink transmission of other mobile nodes in the cell which could result from a timing drift of the mobile node.

During the hold state 410, transmission power control signaling may be discontinued or performed at greater intervals, e.g., at a similar rate as timing control. In this manner, the resource, e.g., base station to mobile node control resource, used for transmission power control signaling can be eliminated or less resource can be dedicated to this purpose than would be possible if power control signaling for all nodes 14, 16 in the hold state was performed at the same rate as in the on state. The mobile nodes 14, 16 transmission power control updates are performed in the mobile node during the hold state at a reduced rate or not at all, in a manner which corresponds to the reduced transmission power control signaling. When transitioning from the hold state 410 to the on state 404, the mobile node 14 may start off with an initial high power level to insure that its signals are received by the base station 12. The power level is then reduced once transmission power control signaling resumes at a normal (full) rate as part of on state operation.

Transition from hold state can be initiated by base station or by the mobile nodes. The base station may initiate a transition by sending a page over a paging channel meant for the hold state users. In one embodiment, the mobile decodes the paging channel with some prearranged periodicity, to check for base station messages. On finding a page message meant for it, it responds with an acknowledgement. In various embodiments the acknowledgement is transmitted over a shared resource on the uplink and is slaved to the page or grant message on the downlink. The mobile node 14 responds to a state change message by moving to the assigned state specified in the received state change message.

In one embodiment, when the mobile node 14 intends to migrate from the hold state 410 to the on state 404, it transmits a state transition request using its dedicated uplink communications channel, which is not shared with any other mobile nodes 16. Since the channel is not shared, the base station 12 is able to receive the request without interference and promptly grant the request assuming the required resources are available taking into account the priority of the user and/or the applications that the user may be using. The mobile on receiving a grant message meant for it, responds with an acknowledgement. The acknowledgment is transmitted over a shared resource on the uplink and is slaved to the grant message on the downlink.

In one exemplary embodiment, when the mobile node does not intend to migrate to another state from the hold state, the mobile node may not transmit any signal in its dedicated uplink communication resource, though the dedicated resource has been assigned to the mobile node and therefore will not be used by any other mobile nodes. In this case, the mobile node can temporarily shut down the transmission module and related functions thereby conserving power.

In another embodiment, the mobile node uses an on/off signaling in its dedicated uplink communication resource, where the mobile node sends a fixed signal (on) when it intends to migrate to another state or does not send any signal (off) when it does not intend to migrate to any other state. In this case, the transmission of the fixed signal can be interpreted as a migration request to the on state if the transmission occurs at certain time instances and as a migration request to the sleep state if the transmission occurs at some other time instances.

In order to provide reachability for a large number of mobile nodes 14, 16, the sleep state 408, requiring relatively few communications resources, is also supported. The mobile node 14 can transition into the sleep state 408, e.g., in response to user input, a period of inactivity, or a signal from the base station 12, from any of the other supported states 404, 404, 410.

In the sleep state 408 the mobile node 14 may, at the behest of the base station 12, serving the cell 10 signal its presence in the cell 10. However, little other signaling is supported during this state 408 of operation. In the exemplary embodiment, during the sleep state 408, timing control signaling and power control signaling are not supported. In addition, the mobile node is not allocated a dedicated uplink for making resource requests and is not allocated bandwidth for use in transmitting payload data, e.g., as part of a communications session with another node 16 conducted through the base station 12.

Transitions from the sleep state 408 to another state 404, 410 occur by passing through access state 402. A shared (contention based), as opposed to a dedicated uplink, communications channel is used to contact the base station 12 to request resources necessary to transition from the sleep state 408 to another state 402, 404, 410. These transitions could be initiated by the base station on the paging channel or by the mobile nodes 14, 16. Since the communications channel used to request resources to transition from the sleep state is shared, a mobile node 14 may encounter delays before being able to successfully transmit the resource request to the base station 12. This is due to possible collisions with similar requests from other mobile nodes. Such delays are not encountered in regard to transitions from the hold state 410 to the on state due to the use of a dedicated uplink resource for requests while in the hold state 410.

The access state 402 is a state through which a node 14 in the sleep state 408 can transition into one of the other supported states 404, 410. The transition out of the sleep state is normally triggered, by an action by a user of the mobile node 14, e.g., an attempt to transmit data to another mobile node 16 or by the base station 12. Upon entering the access state 402, transmission power control and timing control signaling has not yet been established. During access state operation, timing control signaling is established and, in various embodiments, full or partial transmission power control signaling is established with mobile node transmission output power levels being adjusted accordingly. A mobile node can transition from the access state 402, back to the sleep state 408 or to either the on state 404 or the hold state 410. Transition to the sleep state 408 may occur, e.g., in response to a user canceling a transmission request or a base station 12 denying the node the resources required to complete the transition to the hold or on states 404, 410. Transition from the access state to the on state 404 or hold state 410 normally occurs once the mobile node 14 has restored power and timing synchronization signaling with the base station 12 and has been granted the communications resource or resources required to maintain the state into which the mobile node 14 is transitioning.

The establishment of the timing synchronization and transmission power control signaling, in the access state 402, can take some amount of time during which data transmission is delayed. Furthermore, as noted above, delays may result form the use of a shared resources to request the transition which can produce contentions between mobile nodes which take time to resolve. In addition, because of the use of shared resources in requesting a state transition, it is difficult to prioritize between different nodes requesting state transition.

In some embodiments, for an individual cell 10, the maximum number of mobile nodes 14, 16 that can be in the sleep state 408 at any given time is set to be greater than the maximum number of mobile nodes 14, 16 that can be in the hold state 410 at given time. In addition, the maximum number of mobile nodes 14, 16 which can be in the hold state 410 at any given time is set to be greater than the maximum number of nodes that can be in the on state 404 at any given time.

By supporting a hold state in accordance with the present invention, in addition to a sleep state, such delays can be avoided for a number of mobile nodes 14, 16, as transition from the hold state 410 to the on state 404 does not go through the access state, while the number of nodes which can be supported by a single base station 12 is larger than would be possible without the use of the reduced signaling hold state.

From a power standpoint it is desirable that the amount of time and thus power a mobile node spends monitoring for control signals be minimized. In order to minimize the amount of time and power a mobile node spends monitoring for control signals, at least some downlink control signaling, i.e., signaling from the base station to one or more mobile nodes, is performed using multiple control channels. In one embodiment of the invention, particularly well suited for use with mobile nodes capable of supporting multiple states of operation, a plurality of control channels are provided for communicating control signals from the base station to the mobile nodes. Each of the plurality of common control channels is divided into a number of segments, e.g., time slots, where each segment is dedicated, e.g., assigned, for use by one or a group of mobile nodes. In this case, a group of mobile nodes may be, e.g., a subset of the mobile nodes in the system which correspond to a multicast message group. In such an embodiment, the control channels are common to multiple nodes, but each segment of a channel is dedicated, e.g., corresponds to, a particular one of the mobile nodes or group of mobile nodes with other mobile nodes being excluded from using the dedicated segments. The dedicated segments of a common control channel corresponding to an individual mobile node represent a dedicated control channel allocated to the individual mobile node.

The pattern of control channel segment allocation is made known to the individual mobile nodes 14, 16 in a cell, e.g., based on information transmitted to each particular node 14, 16 from the base station 12.

To provide particularly efficient control channel signaling, base station to mobile node control signaling may be performed at several different rates, with a different control channel being used for each of the different control channel signaling rates.

In order to minimize the amount of power and resources consumed by the task of monitoring control channels for information relevant to a mobile node, each mobile node need only monitor to detect signals in control channel segments assigned to the particular node. This allows the mobile nodes to schedule control channel monitoring operations so that the control channels need not be monitored on a continuous basis while still allowing the mobile nodes to receive control signals in a timely manner.

In one embodiment which is particularly well suited for use where mobile nodes that support at least an on state, a hold state and a sleep state, three different segmented control channels are used. The three control channels include an assignment control channel, a fast paging control channel, and a slow paging control channel.

The fast paging control channel and slow paging control channel are periodic in nature, e.g., control signals are not transmitted in terms of time on a continuous basis in these channels. Thus, mobile nodes need not spend power and resources monitoring these channels on a continuous basis. In some embodiments, to further reduce the amount of time and power a mobile needs to spend monitoring the fast and slow paging channels, the channels are segmented and the segments are dedicated to particular mobile nodes or groups of mobile nodes.

In order to minimize the amount of power and resources consumed by the task of monitoring control channels for information relevant to a mobile node, each mobile node need only monitor to detect signals in the fast and slow paging control channel segments assigned to the particular node. This allows the mobile nodes to schedule control channel monitoring operations so that the control channels can be monitored on a less frequent basis than would be possible if all segments need to be monitored for control signals.

Figure 6:
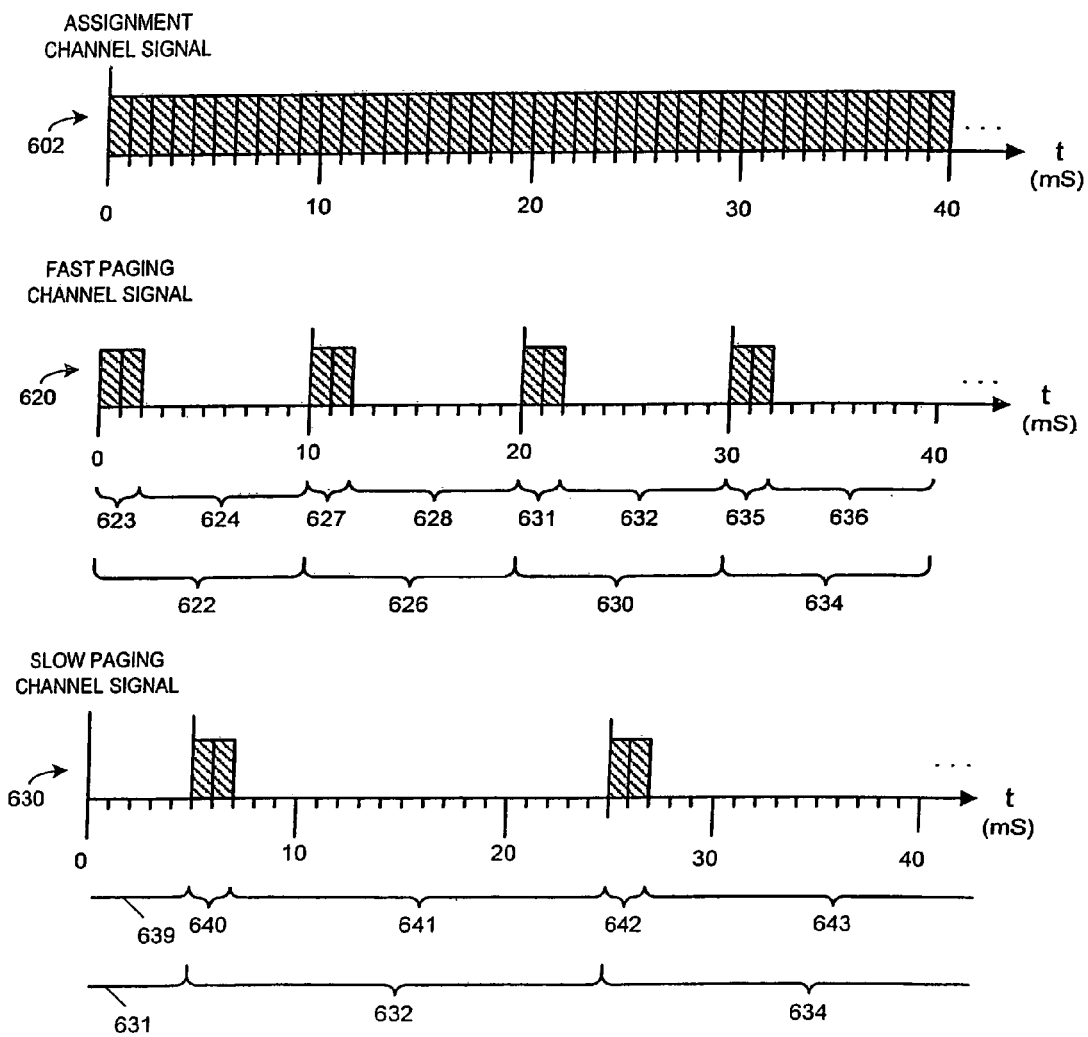
FIG. 6 illustrates the transmissions associated with three exemplary downlink control channels used in accordance with one embodiment of the present invention.

FIG. 6 illustrates control signals 602, 620, 630 corresponding to exemplary assignment, fast paging and slow paging downlink control channels respectively. The assignment channel signal 602 is divided into a plurality of segments, e.g., 1 ms time slots. Transmission in the assignment channel occurs, in the FIG. 6 embodiment, on a continuous basis. For each time slot, there is a corresponding traffic channel segment or segments. Traffic channel segments are allocated by the base station 12 to mobile nodes 14, 16 by transmitting a mobile node identifier or mobile node group identifier in a time slot to indicate that the corresponding traffic segment or segments have been assigned for use to the mobile node(s) corresponding to the transmitted identifier. While in the on state mobile nodes 14, 16 monitor the assignment channel on a continuous basis, e.g., at a rate sufficient to detect the identifier included in each segment of the control channel used for traffic assignment purposes.

During the on state, in addition to the assignment channel each mobile node 14, 16 monitors the periodic fast paging and slow paging channels.

In FIG. 6, fast paging signal 620 can be seen to be periodic in nature. Each exemplary fast paging signal period 622, 626, 230, 634 is 10 ms in duration. However, of this 10 ms period, the fast paging signal is actually transmitted for only a fraction of the full period, e.g., 2 ms. The periods 623, 627, 631, 635 in which the fast paging signal is transmitted are segmented into time slots. The remaining portions 624, 628, 632, 636 represent portions of time in which the fast paging control signal is not broadcast by the base station 12. While only two 1 ms segments are shown in each fast paging on period 623, 627, 631, 635 it is to be understood that there are normally several segments per on period.

To reduce the amount of time mobile nodes 14, 16 need monitor for fast paging control signals, fast paging control channel segments are, in some embodiments, dedicated to individual mobile nodes or groups of mobile nodes. The information on which segments are dedicated to which mobile nodes is normally conveyed to the mobile nodes 14, 16, e.g., from the base station 12. Once the dedication information is known, the mobile nodes 14, 16 can limit their monitoring of fast paging channel segments to segments which are dedicated to them. In such embodiments, mobile nodes can monitor the fast paging channel at periodic intervals greater than the fast paging period without risking missing control information transmitted to the mobile on the fast paging channel.

The segments of the fast paging channel are used to convey information, e.g., commands, used to control the mobile node to transition between states. The segments of the fast paging channel can also be used to instruct the mobile node to monitor the assignment channel, e.g., when the mobile node is in a state which has caused it to stop monitoring the assignment channel. Since the mobile nodes of the system know which segments of the fast paging channel are assigned to them, commands may be included in the fast paging channel segments without mobile node identifiers making for an efficient transmission scheme.

The slow paging channel is segmented and used to convey information in the same manner as the fast paging channel. The information conveyed using the slow paging channel may be the same as, or similar to, the information and commands that are transmitted using the fast paging channel.

In FIG. 6, signal 630 represents an exemplary slow paging channel signal. Note that the full slow paging signal period 632 is longer than the paging period 622 of the fast paging channel. Reference numbers 631 and 634 are used in FIG. 6 to show portions of a slow paging period. Given that the slow paging period is longer than the fast paging period, the time between control signal transmission in the slow paging channel tends to be greater than in the fast paging channel. This means that the mobile node may discontinue monitoring the slow paging channel for longer intervals than is possible with the fast paging channel. It also implies, however, that it may take, on average, longer for a control signal transmitted on the slow paging channel to be received by the intended mobile node.

In FIG. 6, two slow paging signal transmission on signal periods 640, 642 are shown. Signal periods 639, 641, 643 correspond to slow paging channel signal periods during which no slow paging signal is transmitted.

Since the fast and slow paging channels are periodic in nature, if the transmission on periods are staggered so that they do not overlap, the fast and slow paging channels may be implemented using the same physical transmission resources, e.g., tones, with the tones being interpreted as corresponding to either the fast or slow paging channel depending on the time period to which the tones correspond.

The spacing between segments allocated to a particular mobile node in the slow paging channel are often, but need not be, greater than in the fast paging channel. This generally means, in terms of time, that a mobile device needs to monitor the slow paging channel at intervals which are more widely spaced than the intervals at which the fast paging channel is monitored. As a result of the greater spacing of the segments in the slow paging channel, power required to monitor this channel is normally less than that required to monitor the fast paging channel.

In accordance with one embodiment of the present invention different numbers of downlink control channels are monitored in different states. In such embodiments, the assignment, fast paging and slow paging channels are not monitored in all states. Rather, in the on state the greatest number of downlink control channels are monitored, fewer downlink control channels are monitored in the hold state and the lowest number of downlink control channels are monitored in the sleep state.

Figure 7:
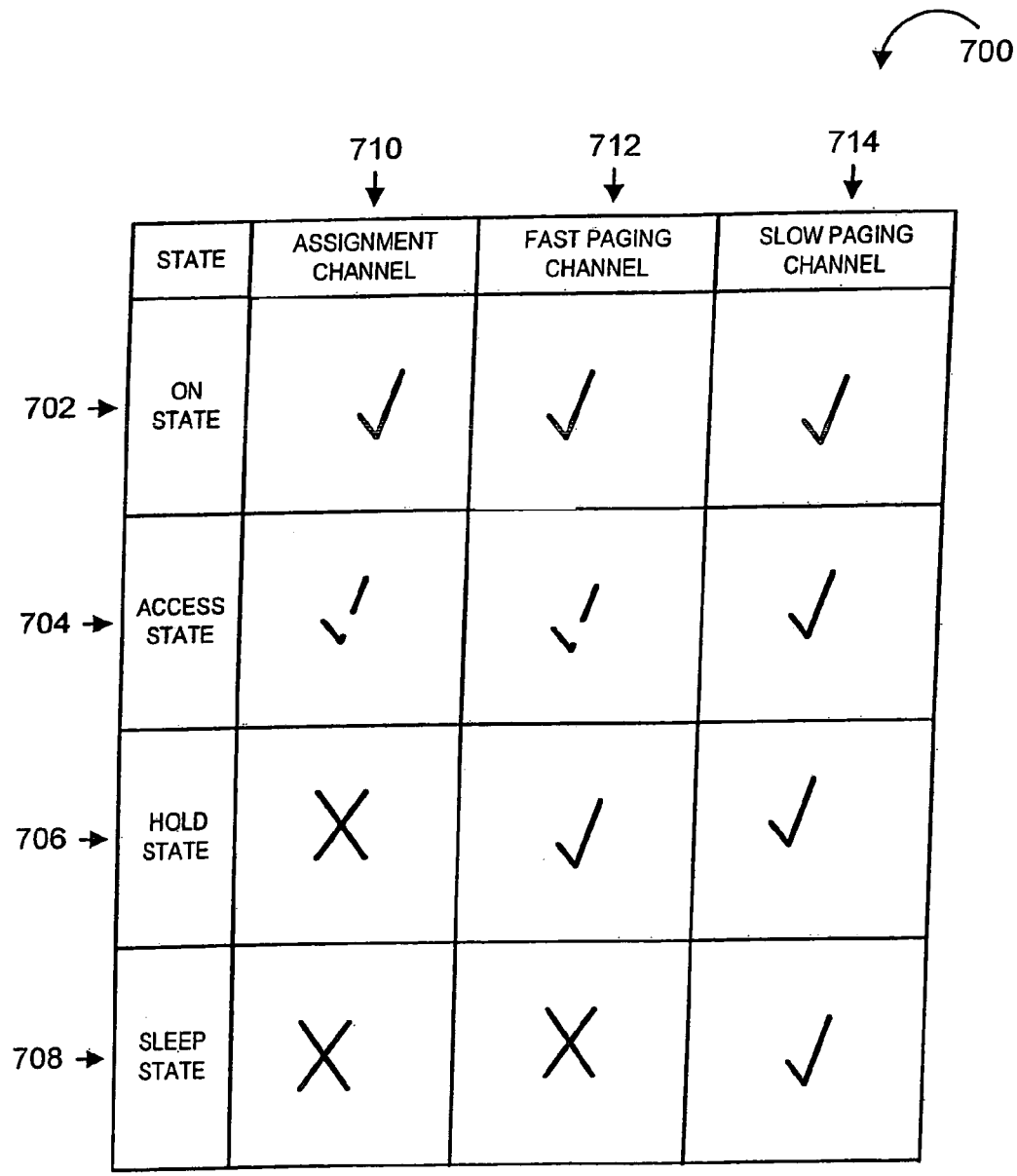
FIG. 7 illustrates which control channels shown in FIG. 6 are monitored in each of the four states in which a mobile node of the present invention may operate.

FIG. 7 shows a table 700 which illustrates the three exemplary base station to mobile node (downlink) control signaling channels and the corresponding four exemplary mobile node states of operation discussed above. In the table 700, a check is used to show control channels which are monitored for a given state while an X is used to indicate a control channel which is not monitored. A dashed check is used to show a control channel which may not be monitored during a portion of the time in that state but is monitored for at least a portion of the time in the state.

From FIG. 7 the first row 702 corresponds to the on state, the second row 704 corresponds to the access state, the third row 706 corresponds to the hold state and the fourth row 708 corresponds to the sleep state. Columns in the table 700 correspond to different segmented control channels. The first column 710 corresponds to the assignment channel, the second column 712 corresponds to the fast paging channel, while the third column 714 corresponds to the slow paging channel.

As can be seen from the table 700, while in the on state a mobile node 14, 16 monitors the assignment channel, fast paging control channel and slow paging control channel. For a portion of the access state, which represents a transition between the on state and either the hold state or the sleep state, the assignment and fast paging channels are monitored. The slow paging channel is monitored for the full period of time the mobile node remains in the access state. As discussed above, monitoring of the fast paging and slow paging channels requires a mobile node to be actively engaged in monitoring on a periodic, as opposed to a continuous, basis.

While in the hold state, the assignment channel is not monitored. However, the fast paging channel and slow paging channel are monitored. Accordingly, a mobile node in the hold state can be instructed to change states and/or monitor the assignment channel for traffic channel segment assignment information in a relatively short period of time.

In the sleep state, of the three control channels shown in FIG. 6, only the slow paging channel is monitored by the mobile node. Accordingly, a mobile node 14, 16 in the hold state can be instructed to change states and/or monitor the assignment channel for traffic channel segment assignment information but such instructions may take longer to be detected, on average, than when in the hold state.

By decreasing the number of control channels that are monitored as operation proceeds from the on state to the less active sleep state, mobile node monitoring and processing resources, and thus power consumption, can be effectively controlled. Thus, the sleep state requires less mobile node resources, including power, than the hold state. Similarly, the hold state requires less mobile node resources, including power, than the on state.

Mobile node transitions from active to less active states of operation may occur in response to commands to change states received from a base station. However, in various embodiments of the invention such transitions are also initiated by mobile nodes 14, 16 in response to detecting periods of downlink control signal inactivity or reduced activity pertaining to the mobile node.

In one embodiment of the invention, activity relating to a mobile node 14, 16 on the control channel which will cease to be monitored if the mobile node reduces its state of activity by one level is used to determine when the mobile node should, on its own, switch to the lower activity level state of operation. For example, in the case of the on state, a mobile node monitors the assignment channel for signals directed to it. When failing to detect signals on the assignment channel for a preselected period of time, or a reduced message level for a period of time, the mobile node 14, 16 switches from the on state to the hold state and ceases to monitor the assignment channel.

While in the hold state, the mobile node 14, 16 monitors the fast paging channel for activity to determine, among other things, if it should switch to a lower activity state of operation, e.g., the sleep state. When failing to detect signals for a preselected period of time, or a reduced signal level for a period of time, the mobile node 14, 16 switches from the hold state to the sleep state and ceases to monitor the fast paging channel.

Using the above discussed methods, monitoring, signal processing and power resources can be conserved in a mobile node 14, 16 through the use of multiple states of operation and through the use of multiple segmented control channels. In addition, limited control resources, e.g., bandwidth used for communicating control information from a base station to a mobile node, is used efficiently as a result of using multiple control channels, e.g., segmented control channels of the type described above.

Numerous variations on the above described methods and apparatus will be apparent to one of ordinary skill in the art in view of the above description of the invention. Such variations remain within the scope of the invention.

What is claimed is:

1. A device comprising a processor configured to control said device to implement a method of operating a mobile node capable of operating in a plurality of states of operation, the method comprising:
monitoring, during a first state of operation, a first control channel to detect control signals in segments of the first control channel intended for said mobile node, and to detect a period of reduced control signaling to said mobile node on said first control channel;
in response to detecting said period of reduced control signaling to said mobile node on said first control channel, transitioning from said first state of operation to a second state of operation, wherein transitioning from said first state of operation to the second state of operation includes ceasing to monitor said first control channel; and
while in said second state of operation:
monitoring a second control channel to detect control signals in segments of the second control channel intended for said mobile node, and to detect a period of reduced control signaling to said mobile node on said second control channel; and
in response to detecting a period of reduced control signaling to said mobile node on said second control channel, transitioning from said second state of operation to a third state of operation.

2. The device of claim 1, wherein transitioning from said second state of operation to the third state of operation includes ceasing to monitor said second control channel.

3. The device of claim 1, wherein monitoring said first control channel during said first state of operation includes monitoring said first control channel on a continuous basis.

4. The device of claim 3, wherein said second control channel is a non-continuous control channel including at least some control segments dedicated to said mobile node.

5. The device of claim 4, wherein the only segments of said second control channel which are monitored during said second state of operation are second control channel segments dedicated to said mobile node.

6. The device of claim 1, wherein the method further comprises:
monitoring, during said first state of operation, said second control channel and a third control channel in addition to said first control channel.

7. The device of claim 6, wherein the method further comprises:
monitoring, during said second state of operation, said third control channel in addition to said second control channel.

8. The device of claim 7, wherein said second and third control channels are periodic control channels including segments dedicated to a plurality of different mobile nodes, at least one segment being periodically dedicated in each of the second and third control channels to said mobile node while said mobile node is operating in said second state of operation.

9. The device of claim 7, wherein the first control channel is an assignment channel used to transmit data communication resource allocation information.

10. The device of claim 9, wherein said second control channel is a paging control channel used to transmit state control information.

11. A computer readable medium embodying computer executable instructions for controlling a mobile node capable of operating in a plurality of states of operation, to implement a method, the method comprising:
monitoring, during a first state of operation, a first control channel to detect control signals in segments of the first control channel intended for said mobile node, and to detect a period of reduced control signaling to said mobile node on said first control channel;
in response to detecting said period of reduced control signaling to said mobile node on said first control channel, transitioning from said first state of operation to a second state of operation, wherein transitioning from said first state of operation to the second state of operation includes ceasing to monitor said first control channel; and
while in said second state of operation:
monitoring a second control channel to detect control signals in segments of the second control channel intended for said mobile node, and to detect a period of reduced control signaling to said mobile node on said second control channel; and in response to detecting said period of reduced control signaling to said mobile node on said second control channel, transitioning from said second state of operation to a third state of operation.

12. The computer readable medium of claim 11, wherein transitioning from said second state of operation to the third state of operation includes ceasing to monitor said second control channel.

13. The computer readable medium of claim 11, wherein monitoring said first control channel during said first state of operation includes monitoring said first control channel on a continuous basis.

14. The computer readable medium of claim 13, wherein said second control channel is a non-continuous control channel including at least some control segments dedicated to said mobile node.

15. The computer readable medium of claim 14, wherein the only segments of said second control channel which are monitored during said second state of operation are second control channel segments dedicated to said mobile node.

16. The computer readable medium of claim 11, wherein the method further comprises:

monitoring, during said first state of operation, said second control channel and a third control channel in addition to said first control channel.

17. The computer readable medium of claim 16, wherein the method further comprises:

monitoring, during said second state of operation, said third control channel in addition to said second control channel.

18. The computer readable medium of claim 17, wherein said second and third control channels are periodic control channels including segments dedicated to a plurality of different mobile nodes, at least one segment being periodically dedicated in each of the second and third control channels to said mobile node while said mobile node is operating in said second state of operation.

19. The computer readable medium of claim 17, wherein the first control channel is an assignment channel used to transmit data communication resource allocation information.

20. The computer readable medium of claim 19, wherein said second control channel is a paging control channel used to transmit state control information.

* * * * *